Dec. 30, 1952   B. A. GUSTAVSSON   2,623,498
CATTLE SHOCK IMPARTING DEVICE
Filed Aug. 5, 1947

INVENTOR
BROR ARTUR GUSTAVSSON

BY *Cushman, Darby & Cushman*
ATTORNEY

Patented Dec. 30, 1952

2,623,498

UNITED STATES PATENT OFFICE 2,623,498

CATTLE SHOCK IMPARTING DEVICE

Bror Artur Gustavsson, Trollhattan, Sweden

Application August 5, 1947, Serial No. 766,177
In Sweden June 16, 1944

Section 1, Public Law 690, August 8, 1946
Patent expires June 16, 1964

5 Claims. (Cl. 119—1)

The present invention relates to an electrical attachment or contrivance devised for cow-barn or the like to cause an animal standing in a crib to step backwards when about to relieve nature, so that the excrements of the animal will be deposited directly into the dung-gutter intended for that purpose. Thus the animals are prevented from relieving nature within the crib, in which latter case the animals would stand stamping in the excrements and would perchance also lie down in the same, before any opportunity presented itself for having them shoveled down into the dung-gutter. Various means are already known for the object in view, the animals' raising their tails in relieving nature having been utilized to trip an action on the animals to compel them to step backwardly. For example, an arrangement is known, by means of which the animal receives a blow on its head by a mallet or club when raising its tail. This arrangement would not be effective, however, or, it would cause harm to the animals. Irritation by means of electric currents has also been made use of, but these arrangements also have been found to be inefficient.

The object of the invention is to provide improved means for the purpose in consideration, whereby to irritate the tail or hind-quarter of the animal by means of an electric current. Such a device has been found to be very effective, probably depending on the fact that cattle are very sensitive to irritation at the tail or near the same, as well as on the fact that irritation of the hind-quarter of the animals causes an animal standing in a crib to step backwards, instinctively or by curiosity, to find out the reason of the irritation. When the animal stands with its head within a fodder crib partitioned by pales or the like, it will be necessary for the animal to step somewhat backwardly to free its head to permit turning of the same in order to find out the reason of the irritation. This backward movement is sufficient to bring the hind-quarter of the animal above the dung-gutter. The contrivance can be made simple and formed so as not to inconvenience the animals.

Figure 1:
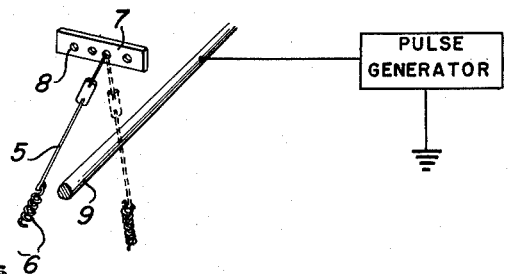
Figure 2:
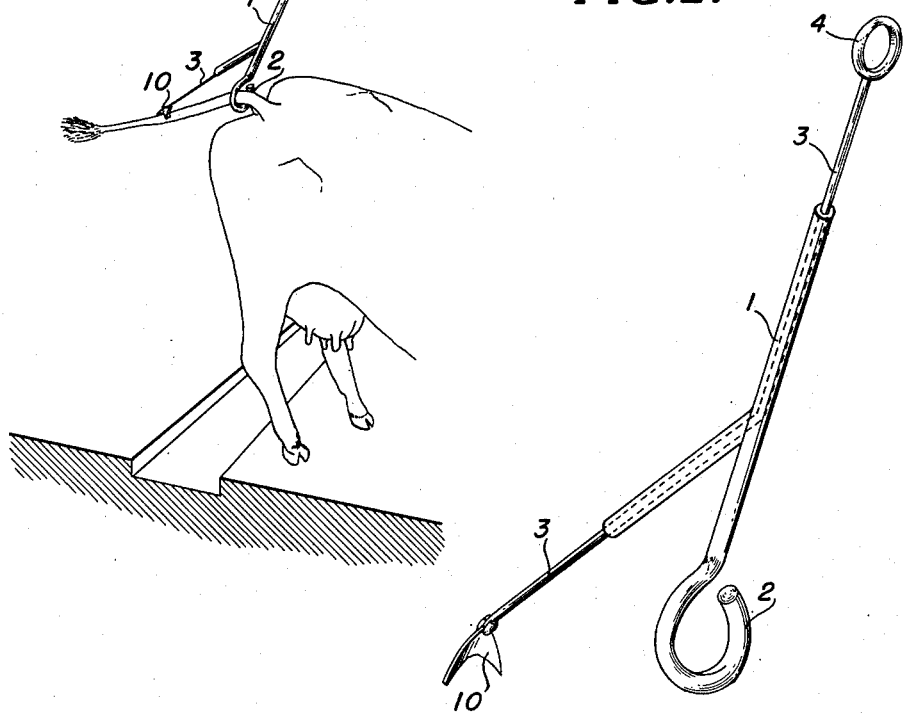

Further objects of the invention appear from the following description of a form of embodiment of the invention as illustrated by way of example in the accompanying drawing. Fig. 1 shows a mounted attachment secured in the operative position about the tail of a cow. Fig. 2 is a view to a larger scale and shows the attachment adapted to be secured about the tail of the animal.

In the embodiment shown in the drawing, the member intended to be secured to the tail of the animal is designated by 1. It is insulated for the major portion thereof and provided with an insulated hook 2, which is laid about the tail of the animal adjacent to the root of the tail, as will be seen from Fig. 1. Preferably, the opening of the hook is somewhat smaller than the thickness of the tail next to the root thereof, so that the hook will have to be thrust onto the tail further down toward the point, in order then to be moved upwardly. Thus the hook will be secured very firmly. A through-conductor 3 is formed at the upper end thereof as an eyelet 4, by means of which the member 1 may be attached to a current conductor 5 suspended from the roof of the cow barn above each stall or crib, and said conductor should be resiliently extensible, for instance by having a spring 6 incorporated therein, so that the animal is free to move in the crib and also to lie down. The conductor 5 is secured in an insulating manner to a suspension means 7 arranged at the roof (shown to an exaggerated scale in the drawing) and provided with a plurality of suspension openings 8. A rail, strap or the like denoted by 9 is electrically connected to a source of pulsating electrical energy, such as the pulse generator which is diagrammatically shown in the drawing. This source of pulsating electrical energy may be similar to the type commonly used for electrical fences, and the electrical impulses which it provides are harmless to the animal, but yet cause sufficient irritation to cause the animal to move.

The conductor is secured to one of the suspension openings 8 in such manner that the conductor 5 is caused to bear normally on the rail 9 while being swung out of contact therewith, after the animal has stepped sufficiently backwards out of the crib. The suspension will thus depend, above all, on the height of the animal.

The conductor 3 of the member 1 is formed at the lower end thereof into a contact member 10, which in its operative position is normally not in contact with the tail but is located somewhat above or outside the upper or outer side of the tail. When the tail is raised, it is brought into contact with the member 10. The animal is subjected to an irritation and steps backwardly in the crib, until the conductor 5 has been brought out of contact with the rail 9 and the irritation ceases. The animal is then supposed to stand immediately at the dung-gutter.

In practice, the arrangement according to the invention has proved very efficient. Also, a great advantage of the same is that it permits of being easily applied to the animal and is serviceable no matter how the animal stands in the crib, in difference from the previously known, more or less fixed arrangements, which function only when the animal is standing approximately in the middle of the crib.

The embodiment above described and shown in the drawing only constitutes an example of an arrangement according to the invention and permits of modifications in various ways within the scope of the invention. For example, the member 10, which is actuated when the animal raises its tail, need not simultaneously form the member which is to mediate the irritation. If a live rail 9 is used, the latter may obviously extend along a whole row of cribs. In this connection, the conductor 5 may also be secured to run laterally on a wire or the like stretched parallel to the live rail, whereby the conductor will be substantially displaced in parallel when the animal moves sideways.

What I claim is:

1. An electrical attachment arranged to be connected to an animal in a stall for irritating the animal to cause the latter to step backwardly, said attachment including a current conductor having an insulated hook portion detachably connected to the tail of the animal and a live contact portion extending outwardly from the hook portion and in the path of upward movement of the tail and normally spaced therefrom, a fixed current contact member operatively associated with said conductor for supplying electrical current to the conductor, said conductor normally being in contact with the fixed member and movable away therefrom to cut off the current supplied to the conductor when the animal steps backwardly, and means operatively connected to said conductor for supporting the conductor above the animal, the parts being constructed and arranged so that upon the animal raising its tail into contact with the live portion of the conductor to irritate the animal so as to cause the latter to step backwardly whereby to move the conductor away from the contact member so that the irritation ceases.

2. An attachment according to claim 1, wherein said current conductor is resiliently extensible.

3. An attachment according to claim 1, wherein said current conductor includes a spring member.

4. An attachment according to claim 1, wherein the upper end of said current conductor is adjustable towards and away from said contact member.

5. An electrical attachment arranged to be connected to an animal in a stall for irritating the animal to cause the latter to step backwardly, said attachment including a current conductor having an insulated hook portion detachably connected to the tail of the animal and a live contact portion extending outwardly from the hook portion and in the path of upward movement of the tail and normally spaced therefrom, a fixed current contact member operatively associated with said conductor for supplying electrical current to the conductor, said conductor normally being in contact with the fixed member and movable away therefrom to cut off the current supplied to the conductor when the animal steps backwardly, and means operatively connected to said conductor for adjustably supporting the attachment above the animal, the parts being constructed and arranged so that upon the animal raising its tail into contact with the live portion of the conductor to irritate the animal so as to cause the latter to step backwardly whereby to move the conductor away from the contact member so that the irritation ceases.

BROR ARTUR GUSTAVSSON.

REFERENCES CITED

The following references are of record in the file of this patent:

UNITED STATES PATENTS

| Number | Name | Date |
|---|---|---|
| 1,411,312 | Swensen | Apr. 4, 1922 |